J. Ball,
Drain Tile,
No 496, Reissued Sept. 15, 1857.
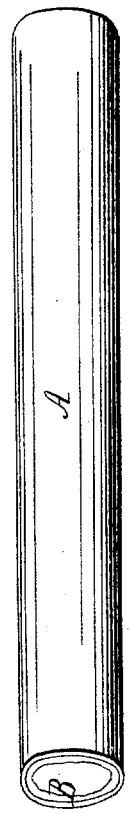
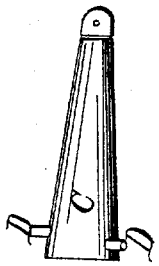
AM. PHOTO-LITHO. CO. N.Y. (OSBORNE'S PROCESS)

UNITED STATES PATENT OFFICE.

JONATHAN BALL, OF ELMIRA, NEW YORK.

IMPROVEMENT IN COATING WATER-PIPES.

Specification forming part of Letters Patent No. 3,375, dated December 15, 1843; Reissue No. 496, dated September 15, 1857.

*To all whom it may concern:*

Be it known that I, JONATHAN BALL, formerly of the city of New York, in the State of New York, but now of Elmira, in said State, have invented certain new and useful Improvements in the Manner of Coating or Lining Metallic Water-Pipes with Hydraulic Cement; and I do hereby declare the following to be a full, clear, and exact description of the same, reference being had to the accompanying drawing, in which are represented one of the pipes in question, and the cone for spreading the cement with certainty and expedition on the inside of the pipe.

It is well known that metal pipes will affect the taste of water, and in a short time so corrode or gather carbuncles or tubercles in the bore as to almost, if not entirely, close them up and render them useless. Hydraulic or Roman cement, if properly applied, will entirely prevent this destruction of water-pipes, but if even the smallest portion of the metal surface be left unprotected by the cement, these tubercles will form and eventually fill the bore of the pipe, or so much so as to materially diminish the flow of water through them. It is therefore of the utmost importance that the cement should be uniformly laid on, and with great certainty, because a defective spot would be difficult to detect in the interior of the pipe, and one such defect would allow the accretions a place to commence to gather on, and the tubercle would rapidly follow. This coating or lining of cement must also, to make the pipes economical, be put on with rapidity. These objects I have effected by the most simple means.

The nature of my invention consists in drawing through the pipe that is to be lined or coated a cone of smaller diameter than the pipe, and furnished with spurs or guides to keep it in the center of the pipe, the difference of diameter between the base of the cone and the bore of the pipe designating the thickness of cement that is thus to be put on.

To enable others skilled in the art to make and use my invention, I will proceed to describe the same with reference to the drawing.

I first prepare a metallic pipe, A, of suitable size. I then take hydraulic cement made into a paste of the desired consistency, and force it into the metallic pipe in such quantities as may be necessary to prevent the oxidation or corrosion of the metal when spread upon the interior surface of the pipe.

B represents the cement on the inside of the pipe.

A small cone, C, of wood or other hard material, of one or more inches in length, is inserted into the end of the pipe into which the cement has been forced. The diameter of the base of this cone should be as much less than the diameter of the bore of the pipe as will be required for the thickness of the cement. Into this cone, a short distance from its base, are inserted three or more small spurs, D, projecting as far as the bore of the pipe will admit, for the purpose of keeping the cone in the center and producing an equal coating upon the pipe. To this apex of this cone is attached a thread or wire, by means of which it is drawn through the pipe, leaving upon its interior surface the required thickness of cement. The base of the cone as it passes through the pipe, effectually closes the traces of the spurs and leaves the cement with a smooth surface. The pipes thus prepared before the cement hardens may be bent into any shape required, and in from twenty to thirty-six hours be ready to admit under any pressure the metal of the pipe is competent to bear. The water hardens the cement and passes through the pipe as sweet and pure as though it stood in a marble or china vessel. By this means the poisonous effects of the oxidation and corrosion of metals, as well as the disagreeable taste imbibed by water passing in metallic pipes, are entirely prevented. The cement being compressed or forced between the two unyielding bodies—viz., the metal of the pipe and the cone—it is driven into every crevice, crack, or opening, and thus the pipe is lined with accuracy and dispatch.

Having thus fully described the nature and object of my invention, what I claim therein as new, and desire to secure by Letters Patent, is—

Lining metallic pipes with hydraulic cement by means of a cone or its equivalent guided through the pipe so as to lay on the cement of equal thickness and with great certainty and economy, substantially as described.

JONATHAN BALL.

Witnesses:

A. B. STOUGHTON,

THOS. H. UPPERMAN.